United States Patent [19]

Lee

[11] Patent Number: 4,616,364
[45] Date of Patent: Oct. 7, 1986

[54] DIGITAL HOPPED FREQUENCY, TIME DIVERSITY SYSTEM

[75] Inventor: William C. Lee, Denville, N.J.

[73] Assignee: ITT Corporation, New York, N.Y.

[21] Appl. No.: 621,963

[22] Filed: Jun. 18, 1984

[51] Int. Cl.[4] .............................................. H04B 15/00
[52] U.S. Cl. ......................................... 375/1; 375/40; 375/51; 375/100; 455/63; 455/303; 455/312
[58] Field of Search .................... 375/1, 40, 45, 51, 82, 375/88, 100; 455/42, 52, 63, 303, 312

[56] References Cited

U.S. PATENT DOCUMENTS

| | | | |
|---|---|---|---|
| 3,523,250 | 8/1970 | Branham | 375/51 |
| 3,953,798 | 4/1976 | Sjostrand et al. | 375/51 |
| 4,128,809 | 12/1978 | Kage | 375/100 |
| 4,291,409 | 9/1981 | Weinberg et al. | 375/1 |

Primary Examiner—Benedict V. Safourek
Attorney, Agent, or Firm—John T. O'Halloran; Thomas F. Meagher

[57] ABSTRACT

The digital hopped frequency, time diversity system comprises a first arrangement to provide a binary bit stream having a plurality of groups each having N bits with each of the plurality of N bit being repeated on at least M different frequencies, where N and M are integers greater than one. Each of the bits of the plurality of groups of N bits is a selected one of a mark and a space with the mark being represented by at least a first frequency and the space being representate by at least a second frequency different than the first frequency. A second arrangement recovers an envelope of a selected one of the first and second frequencies for each bit of the plurality of groups of N bits in each of the M repetitions and converts the recovered mark and space envelopes to a binary representation of the amplitude thereof. A third arrangement adds the binary representation of at least a first predetermined number of the recovered mark envelopes representing an associated one of the bits of the plurality of groups of N bits in each of the M repetitions. A fourth arrangement adds the binary representation of at least a second predetermined number of the recovered space envelopes representing an associated one of the bits of the plurality of groups of N bits in each of the M repetitions. A fifth arrangement provides a mark-space output signal dependent upon the relative amplitude values of the output signal of the third and fourth arrangements.

36 Claims, 7 Drawing Figures

DIGITAL HOPPED FREQUENCY, TIME DIVERSITY SYSTEM

BACKGROUND OF THE INVENTION

The present invention relates to digital diversity combining systems and, more particularly, to a digital hopped frequency, time diversity system.

Apparatus and techniques for radio communication between two points are well known in the prior art. While such communication is most commonly by way of modulating a voice signal on a carrier, techniques are also well known for modulating digital information in serial form on an appropriate carrier for radio transmission. The most common form of such transmission is a fixed point to point tranmission, with the locations of the transmitter and receiver and the transmitter power being selected so as to provide an adequate signal strength at the receiver under substantially all necessary atmospheric conditions.

In certain situations the transmitter or receiver may be mobile, such as by way of example, in police cars, public transportation vehicles, emergency vehicles and/or space, submarine and marine vehicles. Accordingly, signal reflections from buildings and the like and atmospheric conditions may temporarily cause the original signal and a reflected signal to arrive at the receiver with substantially the same amplitude but with opposite phasing, so as to result in serious signal fading and drop out.

There are two approaches which have been commonly used, either alone or together, to minimize the effects of these greatly varying signals. The first is to modulate the information to be transmitted, such as the voice signal, onto two carriers of differing frequencies and to transmit and receive both signals. Since the two signals have different wavelengths because of their different frequencies, it is unlikely that cancellation of both signals will occur simultaneously, so that the strongest signal or some combination of the two signals will provide a much more reliable signal than either signal individually. The second approach is to provide a plurality of receiving stations physically distributed around the expected area of travel of the transmitting station, again using either the strongest signal received or some combination of signals from all receivers. This space diversity, of course, also enhances the ability to derive a useful signal, as signal dropout at phically diverse locations at the same time is increasingly unlikely.

When using a multiplicity of space diversity, time diversity and frequency diversity, the likelihood is very high that at least one spacial-temporal signal is of reasonably high quality for one time increment or message block. The problem, however, is to select each acceptable short message block from the multitude of signals being received and then assemble the short acceptable blocks into the complete message. In the prior art in the case of voice communications, various techniques have been used to attempt to identify the best signal. Rapid and accurate identification of the best signal block is most difficult. In many cases the apparent best signal is manually selected by switching between channels to find one of the demodulated signals which is sufficiently intelligible for the intended communication purposes. However, this is rather tedious particularly under rapidly varying conditions, so that frequently a less than best signal is used until the extent of the fade-out is intollerable.

Certain automatic techniques have also been used for selecting the apparent "best" channel which represents a substantial improvement over the manually switched systems. These prior art systems generally depend upon some signal amplitude responsive measurement to either select the best apparent signal or to provide automatic gain control for each of the signals so that the combined signal emphasizes the better signals. However, since noise cannot be eliminate, such systems are typically responsive either to noise or signal plus noise rather than the quality or information content of the signal alone.

One prior art technique for improving the reception of an intelligible signal in a fading environment is to provide a non-coherent FSK (frequency shift keyed) signal at a rate of 16 Kb/s (kilobits per second) to send a block of 200 bits thirteen times on different hopped frequencies. The hop rate (chip rate) is assumed to be 80 hops per second. Before transmission, the bits are interleaved in a fashion such that two repeated bits are on two different frequencies. After reception, a 7-out-of-13 majority vote logic is used to determine each single message bit. This scheme provides an excellent performance but sacrifices a great deal of data throughput, for instance, 16 Kbs/13 approximately equals 1200 bits per second as compared with a data rate of 16 Kbs. The required transmission bandwidth for this repetition scheme is quite large. For a signal to noise ratio equal to 10 dB (decibel) and a BER (bit error rate) of $10^{-3}$, a repetition of 13 times is needed, that is, the required transmission bandwidth is 13 times the information rate.

As mentioned above, diversity combining techniques have been used for combating multipath fading in analog schemes, as well as digital schemes, in the past. In the range of very high frequency, the space diversity schemes are not feasible for mobile communications.

SUMMARY OF THE INVENTION

An object of the present invention is to provide a diversity system of the hopped frequency, time diversity type which requires only five hops or repeats of the same data to achieve the same signal to noise ratio and bit error rate as in the above-mentioned prior art arrangement.

Another object of the present invention is to provide a hopped frequency, time diversity system that will allow a throughput of data equal to the data rate.

A feature of the present invention is the provision of a digital hopped frequency, time diversity system comprising: first means to provide a binary bit stream having a plurality of groups each having N bits, each of the plurality of groups of N bits being repreated on at least M different frequencies, where N and M are integers greater than one, each of the bits of the plurality of groups of N bits being a selected one of a mark and a space, the mark being represented by at least a first frequency and the space being represented by at least a second frequency different than the first frequency; second means coupled to the first means to recover an envelope of a selected one of the first and second frequencies for each bit of the plurality of groups of N bits in each of the M repetitions and to convert the recovered mark and space envelopes to a binary representation of the amplitude thereof; third means coupled to the second means to add the binary representation of at least a first predetermined number of the recovered mark envelopes representing an associated one of the bits of the plurality of groups of N bits in each of the M repetitions; fourth means coupled to the second means to add the binary representation of at least a second predetermined number of the recovered space envelopes representing an associated one of the bits of the plurality of groups of N bits in each of the M repetitions; and fifth means coupled to the third and fourth means to provide a mark-space output signal dependent upon the relative amplitude values of the output signal of the third and fourth means.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

The improved digital hopped frequency, time diversity system uses one antenna and one transmitter/receiver unit in the very high frequency range.

A repetition of two times employed in this new scheme will provide a great improvement as compared to a no repetition scheme. The additional improvement becomes smaller each time the data is repeated. The conventional repetition scheme mentioned hereinabove with the majority vote does not have this feature.

The length of data stream for each repeat is determined by the size of a memory available. The length of 1000 bits has been chosen for a 3000 bit memory size. The arrangement described herein also can be employed to reduce the threat of electro-countermeasures. The arrangement of the instant application is simple, inexpensive and bandwidth compressed.

In the arrangement mentioned hereinabove, the conventional reprepetition arrangement with majority vote has been shown to require a repetition of 13 times for a signal to noise ratio of 7 dB and a bit error rate of $10^{-3}$. To provide a fair comparison, the new scheme will be described with reference to the same conditions. Actually, the new arrangement can be applied to have repetitions as low as two times.

Figure 1:
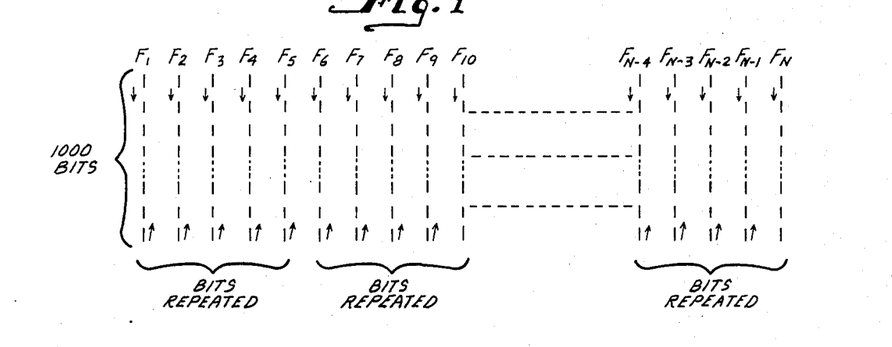
FIG. 1 is a diagram illustrating the transmit data format showing the repetition of bits.

A non-coherent FSK signal at a rate of 80 Kbp is considered as an example for purposes of desciption only. This rate is below the rate which may cause inter-symbol interference due to the medium delay spread in the mobile radio environment. A block of 1000 bits is sent five times as illustrated in FIG. 1. It has been found that after 1000 bits, the chance that both the first bit and the 1001st bit can occur during a fade becomes small. Therefore, all the hopped frequencies do not need to be at least coherent bandwidth apart among them. A random, hopping pattern can be used, such that some of the hops may be identical or adjacent frequency channels. The resultant data stream is shown in FIG. 2 and can be generated as illustrated in block diagram form by the transmitter of FIG. 3.

Figure 2:
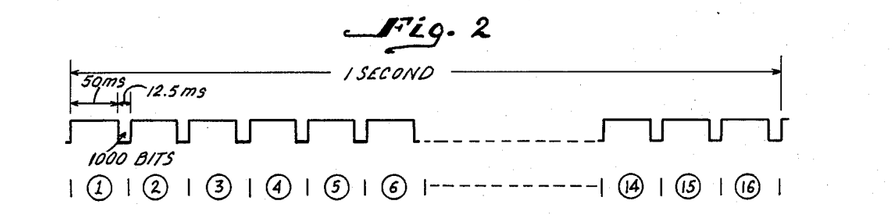
FIG. 2 is an illustration of the data stream after combining the signals of FIG. 1.
Figure 3:
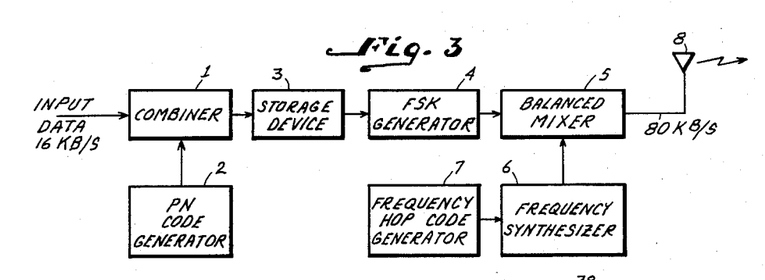
FIG. 3 is a block diagram of one embodiment of a transmitter for the digital hopped frequency, time diversity system in accordance with the principles of the present invention.

The transmitter of FIG. 3 is a FSK/FH (frequency hop) transmitter and can also be referred to as a multiple-bit per chip transmitter where the term "chip" means the hop rate. The transmitter of FIG. 3 includes a combiner 1 to combine the input data at 16 Kb/s with a PN (psuedo noise) data stream from code generator 2. The PN code stream is used for synchronization purposes. The combined signal is presented to a storage device 3 which may be a circulating type storage device which applies the identical data stream of 1000 bits to the FSK generator 4 so as to accomplish the five required repetitions. Generator 4 is such that for a mark bit a first frequency is generated and for a space bit a second frequency is generated. The output of generator 4 is coupled to a balanced mixer 5 which receives the hopped frequencies from the frequency synthesizer 6 under control of the frequency hop code generator 7. The resultant data stream as shown in FIG. 2 is transmitted from antenna 8 to the receiver shown in FIG. 4.

Figure 4:
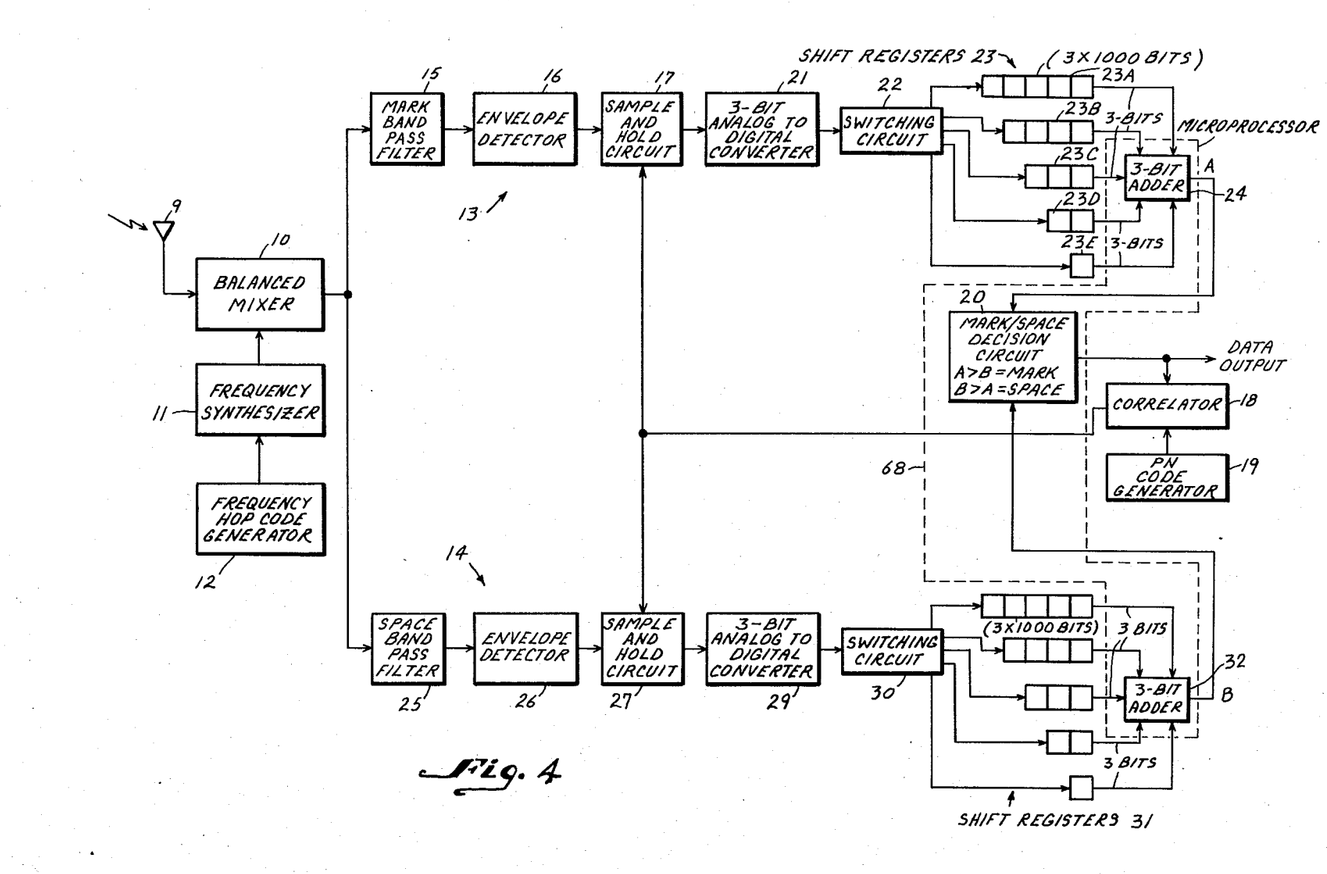
FIG. 4 is a block diagram of a receiver for the digital hopped frequency, time diversity system cooperating with the transmitter of FIG. 3 in accordance with the principles of the present invention.

The receiver of FIG. 4 receives the data stream of FIG. 2 transmitted from antenna 8 of FIG. 3 on antenna 9. The signal received on antenna 9 is coupled to balanced mixer 10, which has coupled thereto frequency synthesizer 11 controlled by the frequency hop code generator 12. To provide coarse synchronization, frequency synthesizer 11 and frequency hop code generator 12 are turned on at the time that frequency synthesizer 6 and code generator 7 of the transmitter of FIG. 3 are turned on. The output of the balance mixer 10 has the hopped frequency removed from the signal and thereby presents to the remainder of the circuit the 1000 bits repeated five times, with each of the bits being represented either by the mark frequency or the space frequency. The output of mixer 10 is coupled to two paths, one a mark path 13 and the other a space path 14. The mark path 13 includes a mark bandpass filter 15 and an envelope detector 16 to recover the envelope of the mark frequency. The output of detector 16 is coupled to a sample and hold circuit 17 to sample the amplitude of the envelope of the mark frequency for each bit of each repretition. The sampling is accomplished by employing the output of correlator 18 and PN code generator 19. Correlator 18 compares the PN code at the output of generator 19 and at the output of the decision circuit 20 to produce a fine synchronization signal so that bits are produced in the receiver which are properly aligned with the bits as produced at the transmitter. The samples at the output of circuit 17 are converted to a 3-bit digital signal by the 3-bit analog to digital converter 21. The digital output from converter 21 is coupled via the cyclic switching circuit 22 to the shift registers 23. Switching circuit 22 operates so that the three bits representing the amplitude of a given bit in the first repetition is coupled to shift register 23A, the three bits representing the amplitude of the given bit in the second repetition is coupled to shift register 23B, the three bits representing the amplitude of the given bit in the third repetition is coupled to shift register 23C, the three bits representing the amplitude of the given bit in the fourth repetition is coupled to shift register 23D and, finally, shift register 23E receives the three bit representation of the amplitude of the given bit in the fifth repetition. By the time three bits of the given bit in the fifth repetition is present in shift register 23E, the digital representation of the amplitude of a particular bit in each of the repetitions is present in the last stage of its appropriate shift register 23. A 3-bit adder 24 adds the amplitude of a particular bit in each of the five repetitions and provides an output A equal to the amplitude of the sum of the amplitudes of a particular bit in each of the repetitions. Similarly, the space bit applied to the space path 14 passes through the space bandpass filter 25 and envelope detector 26 with the envelope at the output of detector 26 being sampled in the sample and hold circuit 27 by the output of the correlator 18. The amplitude of the envelope is converted to a 3-bit representation thereof in analog to digital converter 29 and applied to the switching circuit 30. As described hereinabove, the output of the switching circit 30 couples the digital representations of the amplitude of a particular bit in each of the repetitions to shift registers 31 in a cyclic sequence. The 3-bit output of the last stage of shift registers 31, representing the amplitude of a particular bit in each of the repetitions in 3-bit digital form, is coupled to the 3-bit adder 32 to produce a signal B which is the sum of the amplitudes of a particular bit in each repetition. The mark/space decision circuit 20 provides a PN output for coupling to the correlator 18 and also a mark/space output based upon the relative amplitudes at the output of adders 24 and 32, namely, the relative amplitudes of signals A and B. If signal A is greater than signal B, circit 20 provides a mark output (logic "1"). If, on the other hand, the signal B is greater than signal A, then circuit 20 provides a space output (logic "0").

As compared with the above-mentioned prior art repetition scheme with majority vote there is required a transmission of 208 Kb/s for the same bit error rate and information rate of 16 Kb/s. However, with the new arrangement the transmission rate is only 80 Kb/s. This means a transmission bandwidth compression.

Figure 5:
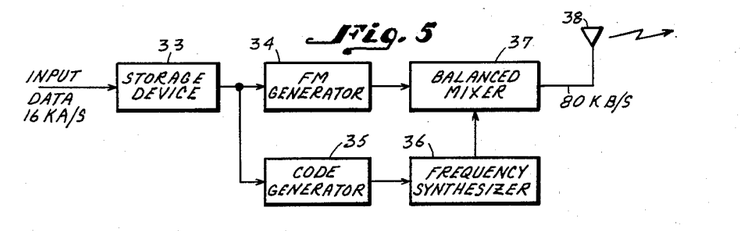
FIG. 5 is a second embodiment of a transmitter for the digital hopped frequency, time diversity system in accordance with the principles of the present invention.
Figure 6:
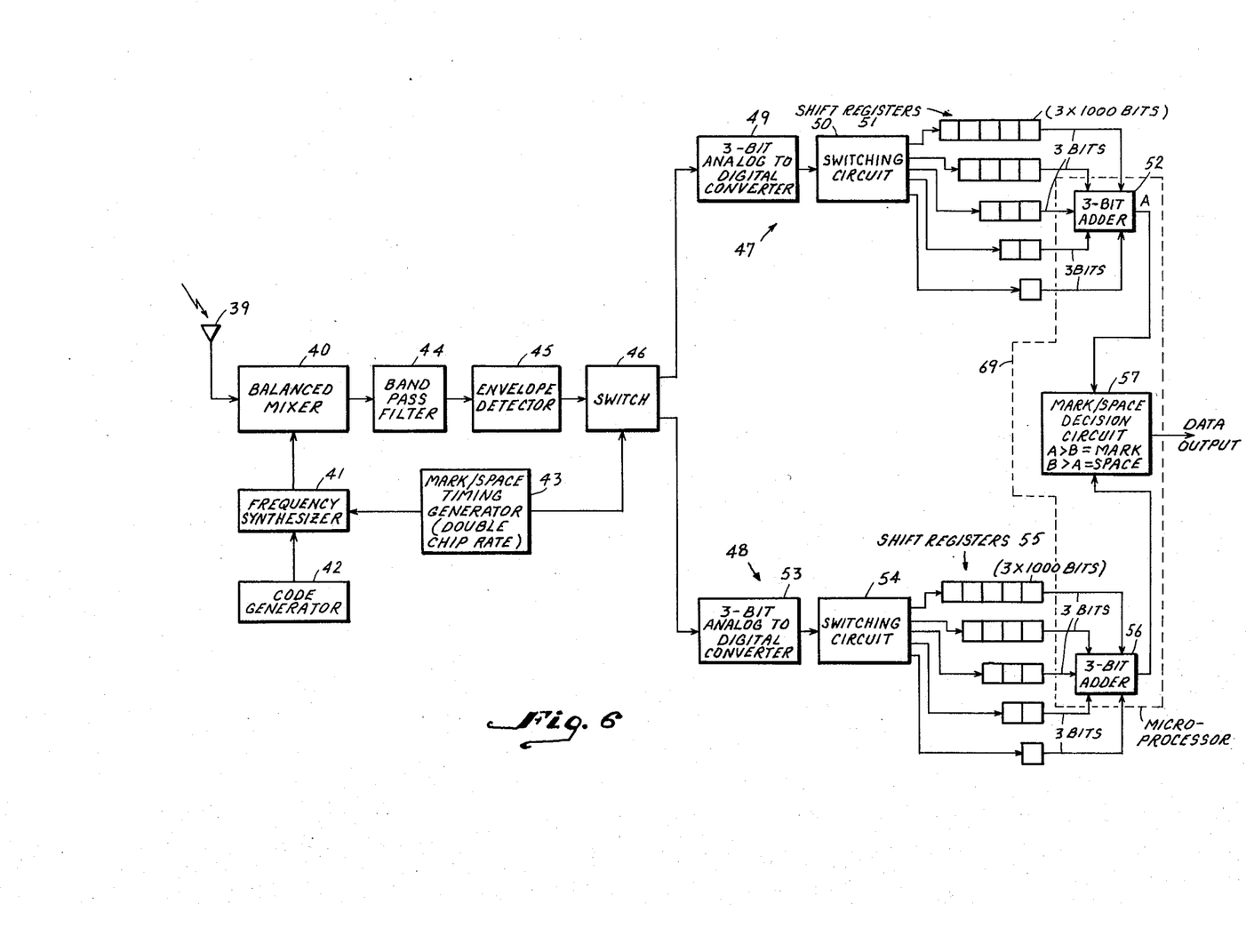
FIG. 6 is a block diagram of a receiver for the digital hopped frequency, time diversity system cooperating with the transmitter FIG. 5.

FIGS. 5 and 6 are block diagrams of a second embodiment of the digital hopped frequency, time diversity system in accordance with the principles of the present invention. Synchronization in this arrangement is accomplished by turning on the equipment at the exact time of the day and may further be enhanced by employing many of the known synchronization arrangements which are not really a part of the instant invention.

The system shown in block diagram in FIGS. 5 and 6 can be referred to as a multiple chips per bit system. In other words, each bit of the 1000 bit data stream or data stream group is represented by two or more different frequencies randomly disposed relative to each other. The system described here will employ three different frequencies to identify a mark with a different three frequencies being employed for each of tne repetitions of a particular bit. A space data bit is identified by still another group of three frequencies with each repeat of this space bit being represented by three different frequencies. The input data is coupled to a storage device of the circulating type so as to enable the repeat of a particular bit the desired number of times. Each data bit from storage device 33 is coupled to an FM (frequency modulation) generator 34 to provide a specific narrow band frequency for each data bit rather than the large number of frequencies present in a square wave bit. Additionally, each bit from device 33 is coupled to code generator 35 which controls frequency synthesizer 36 to provide the group of three frequencies for each data bit at one time and other groups of three different frequencies when the particular bit is repeated. The outputs from generator 34 and synthesizer 36 are mixed in a balanced mixer 37 for transmission from antenna 38 to the receiving antenna 39 of the receiver of FIG. 6.

The received signal is coupled from antenna 39 to balance mixer 40 which receives a second input from frequency synthesizer 41 controlled by code generator 42. The code generator 42 is identical to the code generator 35 in the transmitter of FIG. 5 and is turned on at the same time as that code generator so as to provide the required synchronization. The output from mixer 40 is controlled by the timing generator 43 likewise controlling frequency synthesizer 41 to have a rate double the chip rate of the received signal. This is necessary so that after passing through the bandpass filter 44 and envelope detector 45 the switch 46 which likewise is operating at the double chip rate can appropriately pass the mark and space signals identified by the three different frequencies to the appropriate mark and space paths 47 and 48, respectively. The resultant mark envelope in mark path 47 is coupled to the 3-bit analog to digital converter 49 and, hence, to the switching circuit 50 for coupling the 3 bit binary representation of the amplitude of the envelope in each repeat of a particular bit to the shift registers 51 and, hence, to the 3-bit adder 52 in the same manner as described hereinabove with respect to shift registers 23 of FIG. 4.

The envelope of a space bit represented by the envelope of three different frequencies is converted to a 3-bit binary signal in 3-bit analog to digital converter 53 in the space path 48 which then is appropriately switched by switching circuit 54 to the shift registers 55 in the same manner as described hereinabove with respect to shift registers 23 of FIG. 4. The output of the shift registers 55 are added together in 3-bit adder 56. The signal A at the output of adder 52 and the signal B at the output of adder 56 are coupled to the mark/space decision circuit 57 to provide the mark/space output signal for the receiver based upon the relative amplitudes of signals A and B. A mark or logic "1" signal is provided when signal A is greater than signal B and a space or logic "0" signal is provided when signal B is greater than signal A.

The receivers of FIGS. 4 and 6 can be modified to provide protection against electrocountermeasure by providing an arrangement so as to overlook signals that are attempting to jam the receiver.

This is accomplished by throwing away at least the strongest signal among the five signals being added together in the 3 bit adders 24 and 32 of FIG. 4 and in the 3-bit adders 52 and 56 of FIG. 6. The reasoning behind this is that the strongest branch signal might be caused by enemy jammers. By combining four out of the five branches, the performance will only be slightly degraded.

Figure 7:
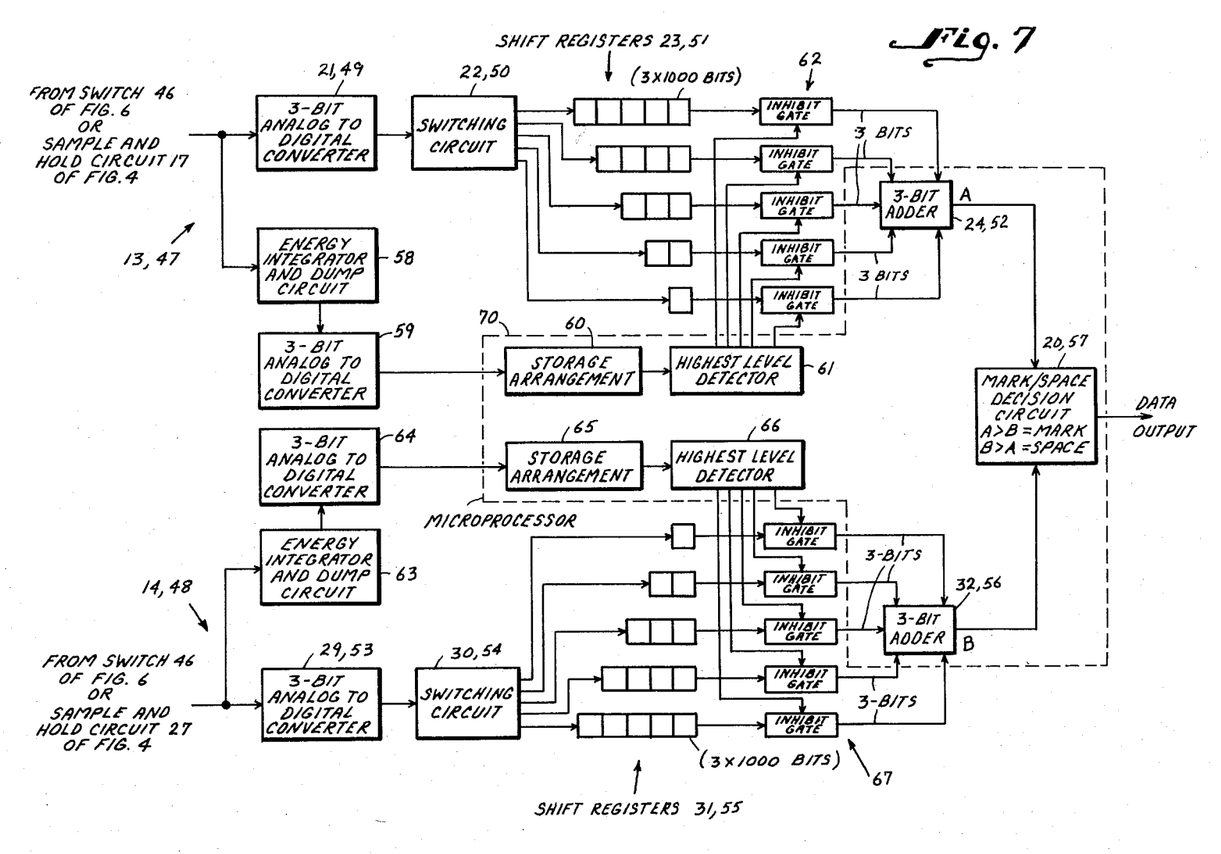
FIG. 7 is a block diagram of electro-counter measures facilities which may be employed with the receivers of FIGS. 4 and 6.

Referring to FIG. 7, such a countermeasure receiver is shown with the block diagram of FIG. 7 representing a modification that could be provided for the receivers of FIGS. 4 and 6 and only the added components will be identified by different reference characters with common components of FIG. 4 and 6 being identified by the reference characters employed in these receivers. The modification of the receiver of FIGS. 4 and 6 as shown in FIG. 7 includes an energy integrator and dump circuit 58 for the mark paths 13 or 47 to integrate the energy of each bit in each repeat. The integrated output of integrator 58 is converted to a binary amplitude level in a 3-bit analog to digital converter 59 with the output thereof being coupled to a storage arrangement 60 to enable a simultaneous detection of the highest level of the bit in each of the repetitions by the highest level detector 61. Level detector 61 can be five comparator circuits to compare the binary amplitude of a particular bit in each of the repetitions against a floating or varying threshold level which varies dependent upon the fading conditions so as to detect the highest level in the five repeats of a particular bit. The highest level detected for a particular bit in a particular repetition is then coupled to the appropriate one of inhibit gates 62 so as to inhibit the output of that one of the shift registers then containing the highest amplitude of a particular bit in a particular repetition to prevent that amplitude from being coupled to the adder 24 or 52, resulting in the throwing away of the strongest signal of the five signals stored in shift registers 23 or 51 storing the amplitude of a particular bit for each of the repetitions.

A similar arrangement is provided in the space paths 14 and 48, namely, the energy integrator and dump circuit 63, the 3-bit analog to digital converter 64, the storage arrangement 65 and the highest level detector 66 along with the inhibit gates 67.

In each of the receivers of FIGS. 4, 6 and 7, a dotted line or block has been shown in these Figures. The components within these dotted blocks 68, 69 and 70 can be replaced by a microprocessor to carry out the functions of the individual discrete circuits enclosed by these dotted blocks.

With regard to the countermeasures arrangement of FIG. 5, it has been described that the strongest one of the five is discarded. If there is a bad jamming situation, the circuitry can be adjusted to block the highest two outputs from the shift registers to the 3-bit adder.

It is not necessary in the present arrangement to employ a scrambler and descrambler to prevent unauthorized access to the data or intelligence being transmitted. The frequency hopping and timing arrangement accomplishes this without employing a scrambling code. However, this does not mean that a scrambling code cannot be employed with the system of the present invention. In fact, the immunity of the system to unauthorized access to the intelligence transmitted therein can be enhanced by employing, in addition to the frequency hopping, a scrambling code.

While I have described above the principles of my invention in connection with specific apparatus, it is to be clearly understood that this description is made only by way of example and not as a limitation to the scope of my invention as set forth in the objects thereof and in the accompanying claims.

I claim:

1. A digital hopped frequency, time diversity system comprising:
    first means to provide a binary bit stream having a plurality of groups each having N bits, each of said plurality of groups of N bits being repeated on at least M different frquencies, where N and M are intergers greater than one, each of said bits of said plurality of groups of N bits being a selected one of a mark and a space, said mark being represented by at least a first frequency and said space being represented by at least a second frequency different than said first frequency;
    second means coupled to said first means to recover an envelope of a selected one of said first and second frequencies for each bit of said plurality of groups of N bits in each of said M repetitions and to convert said recovered mark and space envelopes to a binary representation of the amplitude thereof;
    third means coupled to said second means to add said binary representation of at least a first predetermined number of said recovered mark envelopes representing an associated one of said bits of said plurality of groups of N bits in each of said M repetitions;
    fourth means coupled to said second means to add said binary representation of at least a second predetermined number of said recovered space envelopes representing an associated one of said bits of said plurality of groups of N bits in each of said M repetitions; and
    fifth means coupled to said third and fourth means to provide a mark-space output signal dependent upon the relative amplitude values of the output signal of said third and fourth means.

2. A diversity system according to claim 1, wherein said first means includes
    sixth means to generate frequency shift keyed signals as said first and second frequencies.

3. A diversity system according to claim 2, wherein said second means includes
    a first filter and envelope detector means coupled to said sixth means to recover said envelope of said first frequency,
    a second filter and envelope detector means coupled to said sixth means to recover said envelope of said second frequency,
    a first analog to digital converter coupled to said first filter and detector means to convert the amplitude of said envelope of said first frequency to said binary representation thereof, and
    a second analog to digital converter coupled to said second filter and detector means to convert the amplitude of said envelope of said second frequency to said binary representation thereof.

4. A diversity system according to claim 3, wherein each of said first and second converters is a 3-bit analog to digital converter.

5. A diversity system according to claim 4, wherein said third means includes
    first M storage means coupled to said first converter to store separately said binary representations from said first converter of said associated one of said bits in each of said M repetitions, and
    first adder means coupled to said first M storage means to add said separately stored binary representations simultaneously present at the outputs of said first M storage means.

6. A diversity system according to claim 5, wherein said fourth means includes
    second M storage means coupled to said second converter to store separately said binary representations from said second converter of said associated one of said bits in each of said M repetitions, and second adder means coupled to said second M storage means to add said separately stored binary representations simultaneously present at the outputs of said second M storage means.

7. A diversity system according to claim 6, wherein said fifth means includes
comparison means coupled to said first and second adder means to provide a mark output signal when the amplitude of the output signal of said first adder means is greater than the amplitude of the output signal of said second adder means and a space output signal when the amplitude of the output signal of said second adder means is greater than the amplitude of the output signal of said first adder means.

8. A diversity system according to claim 7, further including
seventh means coupled to said second means and said first M storage means to detect the amplitude of said envelope of said associated one of said bits in each of said M repetitions and to block the output of at least that one of said first M storage means storing said binary representation of said envelope having an excessively large amplitude, and
eighth means coupled to said second means and said second M storage means to detect the amplitude of said envelope of said associated one of said bits in each of said M repetitions and to block the output of at least that one of said second M storage means storing said binary representation of said envelope having an excessively large amplitude.

9. A diversity system according to claim 8, wherein M is equal to five, N is equal to 1000 and said M repetitions have a repetitive rate of 80 kilobits per second.

10. A diversity system according to claim 3, wherein said third means includes
first M storage means coupled to said first converter to store separately said binary representations from said first converter of said associated one of said bits in each of said M repetitions, and
first adder means coupled to said first M storage means to add said separately stored binary representations simultaneously present at the outputs of said first M storage means.

11. A diversity system accordng to claim 10, wherein said fourth means includes
second M storage means coupled to said second converter to store separately said binary representations from said second converter of said associated one of said bits in each of said M repetitions, and
second adder means coupled to said second M storage means to add said separately stored binary representations simultaneously present at the outputs of said second M storage means.

12. A diversity system according to claim 11, wherein said fifth means includes
comparison means coupled to said first and second adder means to provide a mark output signal when the amplitude of the output signal of said first adder means is greater than the amplitude of the output signal of said second adder means and a space output signal when the amplitude of the output signal of said second adder means is greater than the amplitude of the output signal of said first adder means.

13. A diversity system according to claim 12, further including
seventh means coupled to said second means and said first M storage means to detect the amplitude of said envelope of said associated one of said bits in each of said M repetitions and to block the output of at least that one of said first M storage means storing said binary representation of said envelope having an excessively large amplitude, and
eighth means coupled to said second means and said second M storage means to detect the amplitude of said envelope of said associated one of said bits in each of said M repetitions and to block the output of at least that one of said second M storage means storing said binary representation of said envelope having an excessively large amplitude.

14. A diversity system according to claim 2, wherein said third means includes
first M storage means coupled to said second means to store separately said binary representations from said second means of said associated one of said bits in each of said M repetitions, and
first adder means coupled to said first M storage means to add said separately stored binary representations simultaneously present at the outputs of said first M storage means.

15. A diversity system according to claim 14, wherein said fourth means includes
second M storage means coupled to said second means to store separately said binary representations from said second means of said associated one of said bits in each of said M repetitions, and
second adder means coupled to said second M storage means to add said separately stored binary representations simultaneously present at the outputs of said second M storage means.

16. A diversity system acording to claim 15, wherein said fifth means includes
comparison means coupled to said first and second adder means to provide a mark output signal when the amplitude of the output signal of said first adder means is greater than the amplitude of the output signal of said second adder means and a space output signal when the amplitude of th output signal of said second adder means is greater than the amplitude of the output signal of said first adder means.

17. A diversity system according to claim 16, further including
seventh means coupled to said second means and said first M storage means to detect the amplitude of said envelope of said associated one of said bits in each of said M repetitions and to block the output of at least that one of said first M storage means storing said binary representation of said envelope having an excessively large amplitude, and
eighth means coupled to said second means and said second M storage means to detect the amplitude of said envelope of said associated one of said bits in each of said M repetitions and to block the output of at least that one of said second M storage means storing said binary representation of said envelope having an excessively large amplitude.

18. A diversity system according to claim 2, further including
seventh means coupled to said second means and said third means to detect the amplitude of said envelope of said associated one of said bits in each of said M repetitions and to prevent adding at least said binary representation of that one of said envelopes having an excessively large amplitude to the others of said binary representations, and eighth means coupled to said second means and said fourth means to detect the amplitude of said envelopes of said associated one of said bits in each of said M repetitions and to prevent adding at least said binary representations of that one of said envelopes having an excessively large amplitude to the others of said binary representations.

19. A diversity system acording to claim 2, wherein at least said third, fourth and fifth means is a microprocesor.

20. A diversity system according to claim 1, wherein said first means includes sixth means to generate different X random frequencies to represent said mark and said space with said X frequencies for said associated one of said bits in each of said M repetitions being different, where X is an integer greater than one.

21. A diversity system according to claim 20, wherein said second means includes mixer means coupled to said sixth means frequency synthesizer means coupled to said mixer means operating at twice the rate of said N bits, band pass filter and envelope detector means coupled to said mixer means to recover an envelope of said X frequencies representing said mark and said space, switching means coupled to said band pass filter and envelope detector means operating at said twice the rate of said N bits to connect said envelope of said X frequencies representing said mark to a first path and to connect said envelope of said X frequencies representing said space to a second path, and an analog to digital converter present in each of said first and second paths to convert the amplitude of said envelope coupled thereto to said binary representation.

22. A diversity system according to claim 21, wherein each of said analog to digital converter is a 3-bit analog to digital converter.

23. A diversity system according to claim 22, wherein said third means includes first M storage means coupled to said converter in said first path to store separately said binary representations of said envelope of said associated one of said bits in each of said M repetitions, and a first adder means coupled to said first M storage means to add said separately stored binar representations simultaneously present at the outputs of said first M storage means.

24. A diversity system according to claim 23, wherein said fourth means includes second M storage means coupled to said converter in said second path to store separately said binary representation of said envelope of said associated one of said bits in each of said M repetitions, and second adder means coupled to said second M storage means to add said separately stored binary representations simultaneously present at the outputs of said second M storage means.

25. A diversity system according to claim 24, wherein said fifth means includes comparison means coupled to said first and second adder means to provide a mark output signal when the amplitide of the output signal of said first adder means is greater than the amplitude of the output signal of said second adder means and a space output signal when the amplitude of te output signal of said second adder means is greater than the amplitude of the output signal of said first adder means.

26. A diversity system according to claim 25, further including seventh means coupled to said second means and said first M storage means to detect the amplitude of said envelope of said associated one of said bits in each of said M repetitions and to block the output of at least that one of said first M storage means storing said binary representation of said envelope having an excessively large amplitude, and eighth means coupled to said second means and said second M storage means to detect the amplitude of said envelope of said associated one of said bits in each of said M repetitions and to block the output of at least that one of said second M storage means storing said binary representation of said envelope having an excessively large amplitude.

27. A diversity system according to claim 21, wherein said third means includes first M storage means coupled to said converter in said first path to store separately said binary representations of said envelope of said associated one of said bits in each of said M repetitions, and a first adder means coupled to said first M storage means to add said separately stored binary representations simultaneously present at the outputs of said first M storage means.

28. A diversity system according to claim 27, wherein said fourth means includes second M storage means coupled to said converter in said first path to store separately said binary representations of said envelope of said associated one of said bits in each of said M repetitions, and a second adder means coupled to said second M storage means to add said separately stored binary representations simultaneously present at the outputs of said second M storage means.

29. A diversity system according to claim 28, wherein said fifth means includes comparison means coupled to said first and second adder means to provide a mark output signal when the amplitide of the output signal of said first adder means is greater than the amplitude of the output signal of said second adder means and a space output signal when the amplitude of the output signal of said second adder means is greater than the amplitude of the output signal of said first adder means.

30. A diversity system according to claim 29, further including seventh means coupled to said second means and said first M storage means to detect the amplitude of said envelope of said associated one of said bits in each of said M repetitions and to block the output of at least that one of said first M storage means storing said binary representation of said envelope having an excessively large amplitude, and eighth means coupled to said second means and said second M storage means to detect the amplitude of said envelope of said associated one of said bits in each of said M repetitions and to block the output of at least that one of said second M storage means storing said binary representation of said envelope having an excessively large amplitude.

31. A diversity system according to claim 20, wherein said third means includes
   first M storage means coupled to said converter in said first path to store separately said binary representations of said envelope of said associated one of said bits in each of said M repetitions, and
   a first adder means coupled to said first M storage means to add said separately stored binary representations simultaneously present at the outputs of said first M storage means.

32. A diversity system according to claim 31, wherein said fourth means includes
   second M storage means coupled to said converter in said second path to store separately said binary representation of said envelope of said associated one of said bits in each of said M repetitions, and
   second adder means coupled to said second M storage means to add said separately stored binary representations simultaneously present at the outputs of said second M storage means.

33. A diversity system according to claim 28, wherein said fifth means includes
   comparison means coupled to said first and second adder means to provide a mark output signal when the amplitide of the output signal of said first adder means is greater than the amplitude of the output signal of said second adder means and a space output signal when the amplitude of the output signal of said second adder means is greater than the amplitude of the output signal of said first adder means.

34. A diversity system according to claim 33, further including
   seventh means coupled to said second means and said first M storage means to detect the amplitude of said envelope of said associated one of said bits in each of said M repetitions and to block the output of at least that one of said first M storage means storing said binary representation of said envelope having an excessively large amplitude, and
   eighth means coupled to said second means and said second M storage means to detect the amplitude of said envelope of said associated one of said bits in each of said M repetitions and to block the output of at least that one of said second M storage means storing said binary representation of said envelope having an excessively large amplitude.

35. A diversity system according to claim 20, further including
   seventh means coupled to said second means and said third means to detect the amplitude of said envelope of said associated one of said bits in each of said M repetitions and to prevent adding at least said binary representation of that one of said envelopes having an excessively large amplitude to the others of said binary representations, and
   eighth means coupled to said second means and said fourth means to detect the amplitude of said envelopes of said associated one of said bits in each of said M repetitions and to prevent adding at least said binary representations of that one of said envelopes having an excessively large amplitude to the others of said binary representations.

36. A diversity system according to claim 35, wherein at least said third, fourth, fifth, seventh and eighth means is a microprocessor.

* * * * *